(12) United States Patent
Rost et al.

(10) Patent No.: US 7,540,160 B2
(45) Date of Patent: Jun. 2, 2009

(54) SYSTEM AND METHOD FOR VAPORIZING A CRYOGENIC LIQUID

(75) Inventors: Marc Rost, Lansdale, PA (US); Peter Falcone, Media, PA (US)

(73) Assignee: Selas Fluid Processing Corporation, Blue Bell, PA (US)

( * ) Notice: Subject to any disclaimer, the term of this patent is extended or adjusted under 35 U.S.C. 154(b) by 753 days.

(21) Appl. No.: 11/037,034

(22) Filed: Jan. 18, 2005

(65) Prior Publication Data

US 2006/0183064 A1 Aug. 17, 2006

(51) Int. Cl.
F17C 9/02 (2006.01)
F23D 3/40 (2006.01)
F23D 11/44 (2006.01)
F23D 21/00 (2006.01)
F23L 15/00 (2006.01)

(52) U.S. Cl. ............... 62/50.2; 431/7; 431/11; 431/170

(58) Field of Classification Search .......... 62/50.2; 431/11, 7, 170
See application file for complete search history.

(56) References Cited

U.S. PATENT DOCUMENTS

| | | | | |
|---|---|---|---|---|
| 3,712,073 | A | * | 1/1973 | Arenson ............... 62/50.2 |
| 3,720,057 | A | * | 3/1973 | Arenson ............... 60/772 |
| 3,724,426 | A | * | 4/1973 | Brown ............... 122/33 |
| 4,226,605 | A | * | 10/1980 | Van Don ............... 62/50.2 |
| 4,546,610 | A | * | 10/1985 | Zwick ............... 62/50.2 |
| 4,627,388 | A | | 12/1986 | Buice |
| 5,165,884 | A | | 11/1992 | Martin et al. |
| 5,437,152 | A | | 8/1995 | Pfefferle |
| 5,598,709 | A | * | 2/1997 | Viegas et al. ............... 62/50.2 |
| 6,015,540 | A | * | 1/2000 | McAdams et al. ......... 423/659 |
| 6,044,647 | A | | 4/2000 | Drube et al. |
| 6,338,337 | B1 | * | 1/2002 | Panz et al. ............... 126/360.2 |
| 6,367,258 | B1 | | 4/2002 | Wen et al. |
| 6,367,429 | B2 | | 4/2002 | Iwasaki et al. |

FOREIGN PATENT DOCUMENTS

JP 10325510 12/1998

OTHER PUBLICATIONS

Selas Fluid Processing Brochure, Innovative Oxidation Systems, T-Thermal, Thermatrix, 10 pages.
Selas Fluid Processing Brochure, "T-Thermal at the Center of the World of LNG", T-Thermal Submerged Combustion Vaporizer Systems.
International Search Report dated Aug. 15, 2007, application No. PCT/US06/00937.

* cited by examiner

*Primary Examiner*—William C Doerrler
(74) *Attorney, Agent, or Firm*—RatnerPrestia

(57) ABSTRACT

A system is provided for vaporizing a cryogenic liquid. The system includes means for producing an exhaust gas by flameless thermal oxidation of a fuel. The system also includes means for transferring heat from the exhaust gas to the cryogenic liquid. The heat transferring means is coupled to receive the exhaust gas from the exhaust gas producing means. The means for producing an exhaust gas optionally includes an oxidizer having a matrix bed, a fuel/air mixture inlet positioned to deliver the fuel/air mixture to the matrix bed, and an exhaust outlet positioned to deliver the exhaust gas from the oxidizer to the heat transferring means. The means for transferring heat optionally includes a receptacle configured to hold a heat transfer medium, a conduit for cryogenic liquid extending into the receptacle, and a sparger positioned to deliver exhaust gas from the exhaust gas producing means to the receptacle.

18 Claims, 11 Drawing Sheets

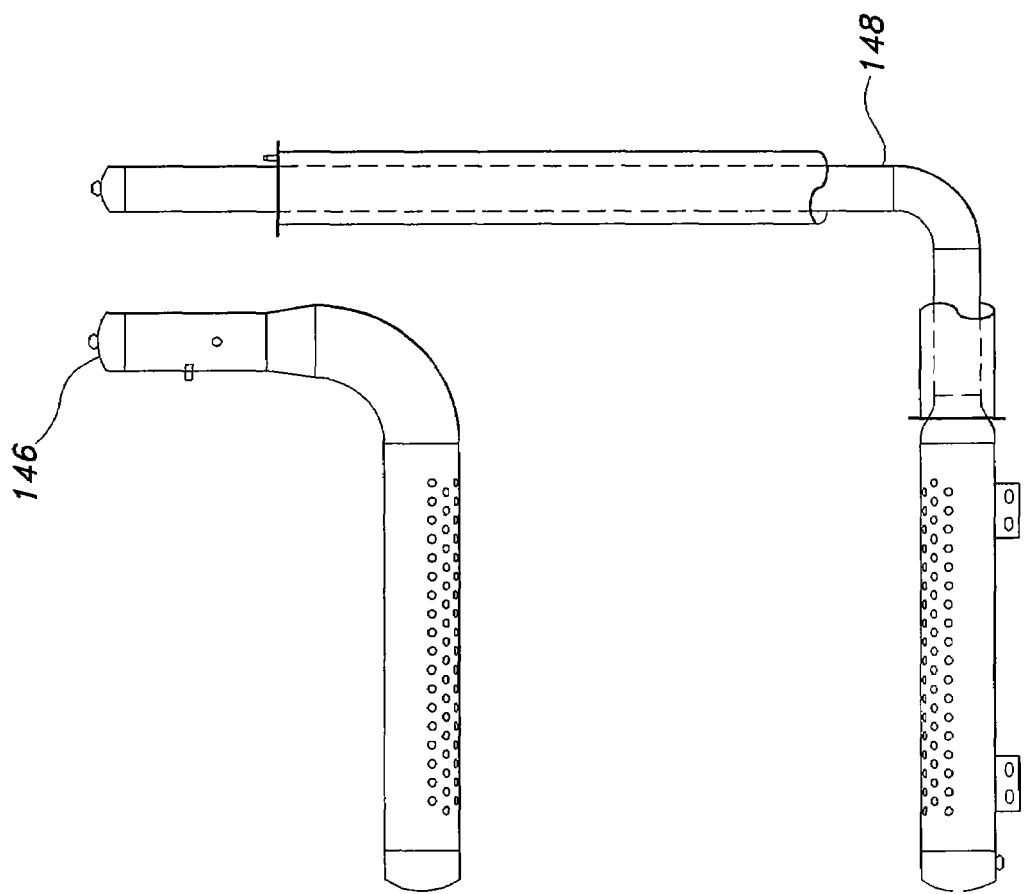

SYSTEM AND METHOD FOR VAPORIZING A CRYOGENIC LIQUID

FIELD OF THE INVENTION

This invention relates to a system and method for vaporizing a cryogenic liquid and, more particularly, a system for providing heat for cryogenic liquid vaporization.

BACKGROUND OF THE INVENTION

It is often necessary or desirable to vaporize a cryogenic liquid (i.e., to bring about vaporization of a cryogenic liquid to a vaporized state). For example, and though a wide variety of applications exist for liquid vaporization, it is often necessary or desirable to vaporize liquid natural gas (LNG) so that it can be handled and distributed as a fuel source.

Many vaporization systems operate with burners in order to produce the necessary vaporization heat. For example, evaporators of the submerged combustion type comprise a water bath in which a flue gas tube of a gas burner is installed as well as an exchanger tube bundle for the vaporization of the liquefied gas. The gas burner discharges the combustion flue gases into the water bath, which heat the water and provide the heat for the vaporization of a liquefied gas that flows through the tube bundle. Such vaporization systems are provided, for example, by T-Thermal Company, a division of Selas Fluid Processing Corporation, under the registered trademark SUB-X.

Evaporators of this type are reliable and of compact size, but they may become expensive to operate. For example, in order to reduce emissions of nitrogen oxide (NOx) from such systems, a current practice utilizes a gaseous fuel burner in combination with water injection to reduce NOx emissions. In such systems, NOx emissions can be reduced to approximately 30 ppmvd, corrected to 3 volume percent oxygen (dry basis).

Further reduction of NOx emissions may require post combustion catalytic treatment. For example, a catalytic treatment system may be located at the outlet of a submerged liquid bath. Such treatment utilizes a portion of the burner exhaust to reheat the gases that are exiting the liquid bath, so as to reduce the moisture content of the gases before they enter the post combustion catalytic system. The corresponding use of this portion of the burner exhaust can, however, reduce the energy efficiency of the system, since this portion of the burner gases are not used to heat the cryogenic fluid.

Accordingly, there remains a need for an improved method and system for cryogenic liquid vaporization.

SUMMARY OF THE INVENTION

According to one aspect of this invention, a system is provided for vaporizing a cryogenic liquid. The system includes means for producing an exhaust gas by flameless thermal oxidation of a fuel. The system also includes means for transferring heat from the exhaust gas to the cryogenic liquid. The heat transferring means is coupled to receive the exhaust gas from the exhaust gas producing means.

The means for producing an exhaust gas optionally includes an oxidizer having a matrix bed, a fuel/air mixture inlet positioned to deliver the fuel/air mixture to the matrix bed, and an exhaust outlet positioned to deliver the exhaust gas from the oxidizer to the heat transferring means. The means for transferring heat optionally includes a receptacle configured to hold a heat transfer medium, a conduit for cryogenic liquid extending into the receptacle, and a sparger positioned to deliver exhaust gas from the exhaust gas producing means to the receptacle.

According to another aspect of this invention, a method is provided for vaporizing a cryogenic liquid. The method includes oxidizing a fuel in a flameless thermal oxidizer to produce an exhaust gas. Heat is then transferred from the exhaust gas to the cryogenic liquid, thereby vaporizing the cryogenic liquid. The oxidizing step optionally includes delivering fuel/air mixture into a matrix bed, and the transferring step optionally includes introducing exhaust gas into a heat transfer medium.

According to yet another aspect of this invention, a method provides a heat source to a vaporizer of cryogenic liquid. The method includes coupling a flameless thermal oxidizer to the vaporizer, and configuring the flameless thermal oxidizer to deliver exhaust gas to the vaporizer. The coupling step optionally includes coupling an exhaust outlet of the flameless oxidizer to a sparger of the vaporizer.

According to still another aspect of this invention, a method is provided for vaporizing a cryogenic liquid with reduced NOx emissions. The method includes oxidizing fuel using a flameless thermal oxidizer, and transferring heat from exhaust gases generated by said oxidizing step to a cryogenic liquid. The method optionally includes emitting less than about 5 ppmvd NOx, emitting about 4 ppmvd NOx or less, or emitting about 2 ppmvd NOx or less, corrected to 3 volume percent oxygen (dry basis). Also, the method is optionally performed without catalytic treatment.

According to another aspect, this invention provides a flameless thermal oxidizer having a matrix bed containing media, an inlet tube extending into the matrix bed and having an outlet positioned to deliver reacting gases into the matrix bed. The matrix bed defines a void proximal the outlet of the inlet tube.

In the oxidizer, a disc is optionally positioned adjacent the outlet of the inlet tube and configured to direct reacting gases away from the inlet tube. The void defined in the matrix bed is optionally substantially cylindrical.

According to another aspect, this invention provides a method of reducing pressure losses in a flameless thermal oxidizer, the method including introducing reacting gases from an inlet tube into a void defined by a matrix bed.

BRIEF DESCRIPTION OF THE DRAWINGS

Exemplary embodiments of the invention will be described with reference to several embodiments selected for illustration in the drawing, of which:

FIG. 8B is a cross-sectional end view of the tube bundle assembly illustrated in FIG. 8A.

DETAILED DESCRIPTION OF THE INVENTION

Figure 1:
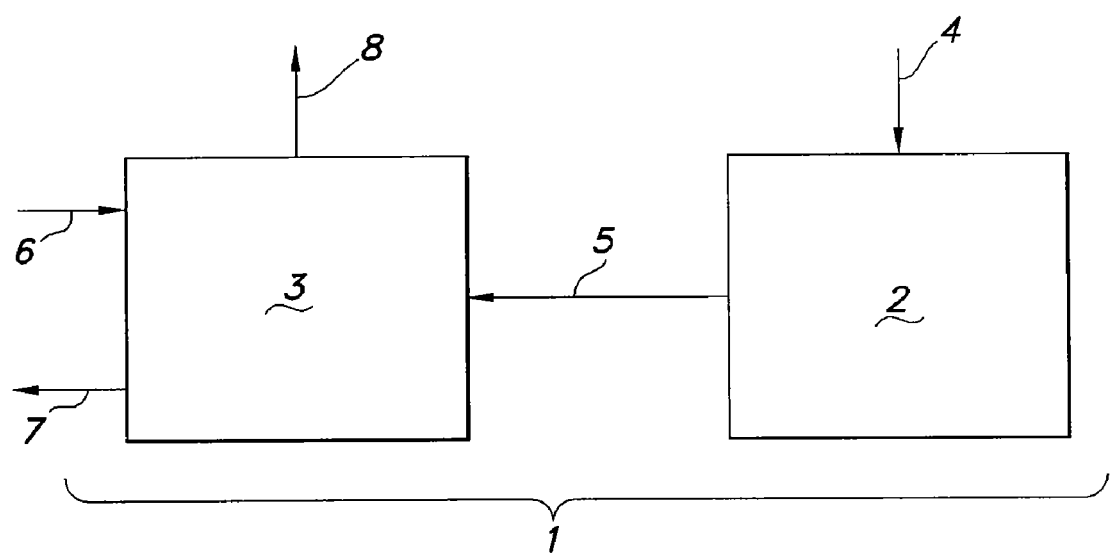
FIG. 1 is a schematic, block diagram of a vaporization system according to one exemplary embodiment of this invention.

The invention will next be illustrated with reference to the Figures. Such Figures are intended to be illustrative rather than limiting and are included herewith to facilitate explanation of the present invention. The Figures are not to scale, and are not intended to serve as engineering drawings.

A flameless thermal oxidizer (FTO) has been coupled with a cryogenic heat exchanger according to one aspect of this invention to vaporize a liquid such as liquefied natural gas prior to injection into a utility distribution system. The resulting vaporization system minimizes oxides of nitrogen (NOx) emissions to the environment normally associated with conventional combustion processes. The thermal reaction of commercial fuel gas with air in a matrix bed of porous inert media is accomplished using the flameless thermal oxidizer. The reaction is optionally conducted in an apparatus that is capable of establishing and maintaining a non-planar reaction wave within the matrix bed.

Generally, and according to one exemplary embodiment, the vaporization system includes a vessel that contains a matrix bed; one or more feed tubes that extend into the matrix bed; a burner or other matrix bed preheat system; connecting ductwork to a heat exchanger (such as the Sub-X® heat exchanger provided by T-Thermal Company of Blue Bell, Pa.); process controls; and an exhaust outlet to the atmosphere. A non-planar reaction wave (such as the one formed by the oxidizer shown in FIG. 3, for example) is established by heating at least a portion of the matrix bed to the minimum reaction temperature of a commercial fuel gas/air mixture and feeding said mixture at controlled rates into the feed tube(s). Upon exiting the feed tube(s), the commercial fuel gas/air mixture is reacted in a non-planar reaction wave to produce heat and non-toxic combustion products.

The heat generated in the non-planar reaction wave maintains the interior surfaces of the vessel at a temperature of at least 1600 degree F. but less than 2400 degree F. during the entire operation, which minimizes the formation of NOx emissions. The hot exhaust gases are directed from the vessel through ductwork to a specialized cryogenic heat exchanger submerged in a water bath. Cryogenic liquids are directed through tubes in the interior of the heat exchanger as the quenched exhaust gases contact the exterior surfaces of the tubes via the water bath. The cryogenic fluid inside the heat exchanger completes a phase change to a gaseous product resulting from the flow of heated gases within the water bath. Exhaust gases exit the water bath and are released to the atmosphere via a stack.

The natural gas vaporization capacity of the system ranges from about 150 to 200 million cubic feet per day, dependent on operating pressure conditions. Heat release rate for the flameless thermal oxidizer is 120 MMBtu/hr, and the emission rate of nitrogen oxides is reduced.

The emissions of nitrogen oxides from the flameless oxidation process are approximately 2 ppmvd (corrected to 3 volume percent oxygen (dry basis)), which is significantly lower than the nitrogen oxide emissions from the burner exhaust of the current practice. The use of the flameless oxidation eliminates the need for water injection, as well as the post combustion catalytic NOx reduction treatment system. This elimination of the catalytic treatment system in turn eliminates the reoccurring use of both the catalyst and associated reducing agent (such as ammonia). Catalyst has a limited operating lifetime and is expensive to replace. The elimination of the reducing agent may make the system safer to operate by eliminating the storage and handling of ammonia. The elimination of the post catalytic treatment system along with the necessary heat input required to reheat the exhaust gases will increase the system energy efficiency by utilizing all of the flameless oxidation exhaust to heat the cryogenic fluid.

Referring to the Figures generally, and according to one aspect of this invention, a system 1, 100 is provided for vaporizing a cryogenic liquid. To heat or vaporize fluids such as cryogenic liquids, the system 1, 100 utilizes flameless oxidation to provide the heat input into a submerged heat exchanger coil.

The system 1, 100 includes means for producing an exhaust gas by flameless thermal oxidation of a fuel/air mixture. For example, the means for producing an exhaust gas optionally includes an oxidizer 2, 10, 40, 70, 108 having a matrix bed 29, 42, 72,112; a fuel/air mixture inlet 4, 54 positioned to deliver the fuel/air mixture to the matrix bed 29, 42, 72,112; and an exhaust outlet 5, 45, 78A, 78B, 114 positioned to deliver the exhaust gas from the oxidizer 2, 10, 40, 70, 108.

The system 1, 100 also includes means for transferring heat from the exhaust gas to the cryogenic liquid. For example, the means for transferring heat optionally includes a vaporizer 3 having a receptacle 122 configured to hold a heat transfer medium; a conduit 118, 144 for cryogenic liquid extending into the receptacle; and a sparger 138 positioned to deliver exhaust gas from the exhaust gas producing means to the receptacle 122.

The heat transferring means of the system 1, 100 is coupled to receive the exhaust gas from the exhaust gas producing means. In this manner, the products of reaction or oxidation in the exhaust gas producing means are delivered to the heat transferring means. Such heat transfer brings about vaporization of a cryogenic liquid.

In use of system 1, 100, a fuel/air mixture is oxidized in a flameless thermal oxidizer 2, 10, 40, 70, 108 to produce an exhaust gas. Heat is then transferred from the exhaust gas to the cryogenic liquid, thereby vaporizing the cryogenic liquid. The oxidizing step optionally includes delivering fuel/air mixture into a matrix bed 29, 42, 72,112, and the transferring step optionally includes introducing exhaust gas into a heat transfer medium such as water.

To modify or retrofit a vaporizer of cryogenic liquid according to one aspect of this invention, a flameless thermal oxidizer 2, 10, 40, 70, 108 is coupled to the vaporizer 3, and the flameless thermal oxidizer 2, 10, 40, 70, 108 is configured to deliver exhaust gas to the vaporizer 3. The coupling step optionally includes coupling an exhaust outlet 5, 45, 78A,

78B, 114 of the flameless oxidizer 2, 10, 40, 70, 108 to a sparger 138 of the vaporizer 3.

To reduce NOx emissions according to another aspect of the invention, a fuel/air mixture is oxidized using a flameless thermal oxidizer 2, 10, 40, 70, 108, and heat from exhaust gases generated by the oxidizing step is transferred to a cryogenic liquid. The NOx emissions can be reduced to less than about 5 ppmvd NOx, preferably about 4 ppmvd NOx or less, or more preferably about 2 ppmvd NOx or less, corrected to 3 volume percent oxygen (dry basis). The reduction of NOx emissions is optionally performed without catalytic treatment.

According to another aspect of this invention, a flameless thermal oxidizer 70 has a matrix bed 72 containing media, an inlet tube 80 extending into the matrix bed 72 and having an outlet positioned to deliver reacting gases into the matrix bed 72. The matrix bed 72 defines a void 73 proximal the outlet of the inlet tube 80. A disc 82 is optionally positioned adjacent the outlet of the inlet tube 80 and configured to direct reacting gases away from the inlet tube 80. The void 73 is optionally substantially cylindrical.

To reduce pressure losses in a flameless thermal oxidizer, reacting gases can therefore be introduced from an inlet tube 80 into a void 73 defined by a matrix bed 72. Also, plural exhaust outlets 78A, 78B can be provided to exhaust reacted gases from the oxidizer 70.

It has been discovered that this invention provides an efficient vaporization technology with very low oxides of nitrogen emissions (NOx) resulting from the combustion of natural gas fuel. For example, a typical burner system may operate with up to 40 percent excess air in a LNG vaporizer as compared to approximately 175 percent excess air with a flameless thermal oxidizer. Such excess air is beneficial in that it limits the maximum adiabatic temperature achieved in the oxidizer to less than the Zeldovich reaction mechanism requirements for high levels of NOx production. Fuel consumption is unchanged when the burner and flameless thermal oxidizer technologies are compared, but the volume of gases handled by the equipment is significantly larger for a flameless thermal oxidizer system according to this invention.

A LNG vaporizer burner system together with water injection can produce NOx emissions in the range from 35 to 50 ppmvd. A LNG vaporizer using a flameless thermal oxidizer as the heat source according to this invention can produce NOx emissions in the range from 2 to 4 ppmvd, though NOx emissions lower than 2 ppmvd and greater than 4 ppmvd are contemplated as well (the foregoing NOx emissions values being corrected to 3 volume percent oxygen on a dry basis).

In order to reduce NOx emissions (e.g., to comply with NOx emission regulations), burner systems typically use post-combustion treatment processes involving a catalyst and injection of a reducing agent chemical. These post-combustion control systems tend to be expensive, difficult to maintain, and require periodic shutdowns for catalyst cleaning and replacement.

Referring specifically to the embodiments selected for illustration in the figures, FIG. 1 provides a schematic illustration of an embodiment of a vaporization system, generally indicated by the numeral 1, according to one aspect of this invention. Vaporization system 1 includes a flameless thermal oxidizer 2 that is coupled to a vaporizer 3. The flameless thermal oxidizer 2 is configured to receive a fuel/air mixture 4 for reaction within the flameless thermal oxidizer 2. Flameless thermal oxidizer 2 is also configured to deliver exhaust gases 5 that are produced as a result of the oxidation or reaction of the fuel/air mixture 4.

The vaporizer 3 is configured to receive the exhaust gases 5 from the flameless thermal oxidizer 2. The vaporizer 3 is also configured to receive a cryogenic liquid 6 and to deliver a vaporized gas 7. Vaporizer 3 is also configured to deliver emissions 8.

The hot exhaust gases 5 delivered from the flameless thermal oxidizer 2 to the vaporizer 3 causes vaporization of the cryogenic liquid 6 into a vaporized gas 7. Accordingly, the heat from exhaust gases 5 provides a heat source for the vaporization of the cryogenic liquid 6, and the exhaust gases 5 received in the vaporizer 3 from the flameless thermal oxidizer 2 are discharged from the vaporizer 3 in the form of emissions 8 either for further treatment or discharge to the atmosphere.

Figure 2:
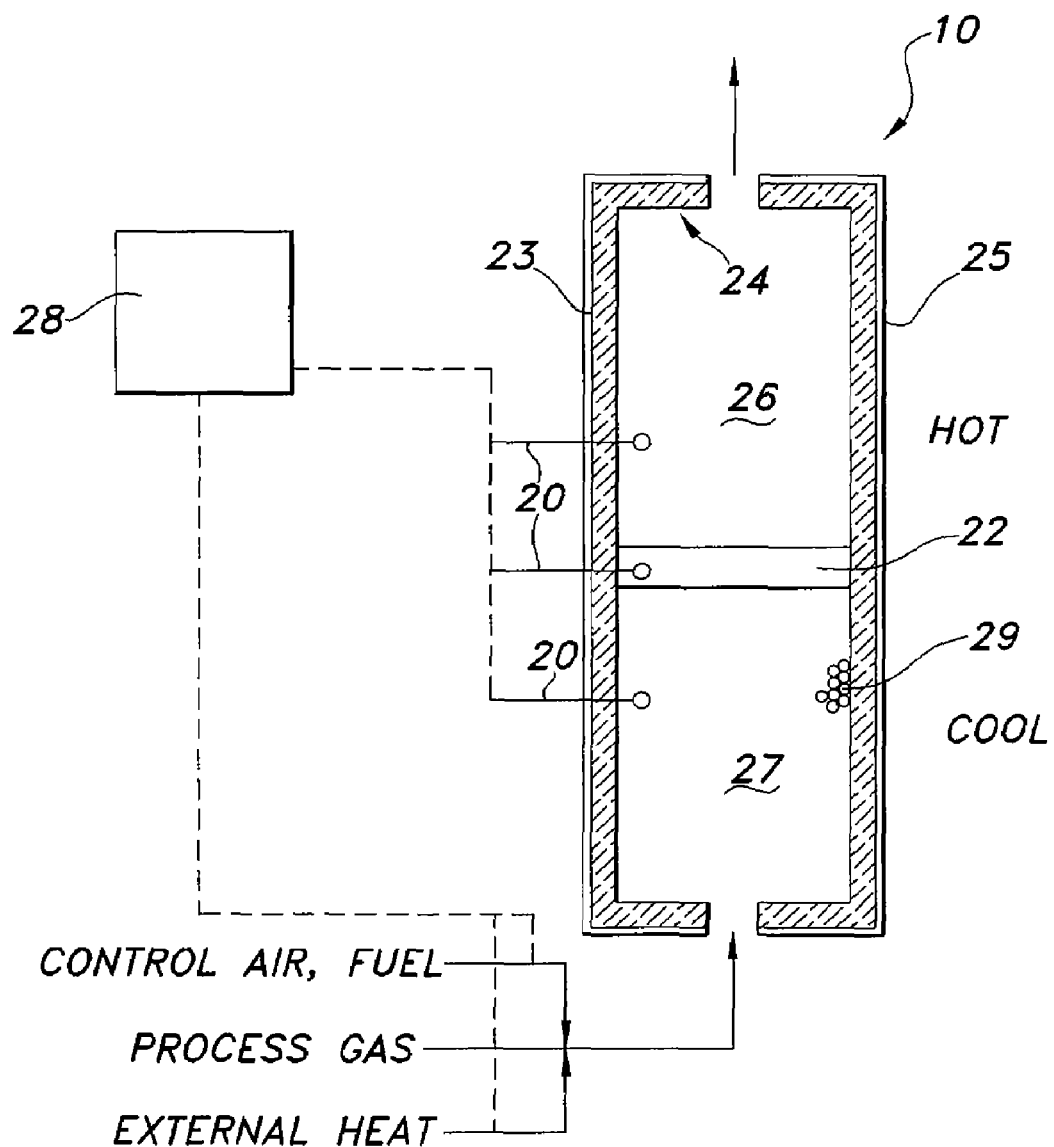
FIG. 2 is a schematic diagram of an embodiment of a flameless thermal oxidizer capable of use in the vaporization system illustrated in FIG. 1.

FIG. 2 illustrates an exemplary embodiment of a flameless matrix bed reactor, generally designated by the numeral 10, which can be used in the vaporization system 1 illustrated in FIG. 1 as a component of the flameless thermal oxidizer 2.

Referring to FIG. 2, there is shown a schematic of the internal temperature zones in a flameless matrix bed reactor 10 that contains a planar reaction wave 22. Additional details of the flameless matrix bed reactor 10 can be found in U.S. Pat. No. 6,015,540, which is incorporated herein by reference in its entirety.

The flameless reactor 10 includes a vessel 25, having a matrix bed of porous inert media 29. The vessel is lined with a refractory material. Prior to the planar reaction wave, there is typically a cool zone 27 that has a temperature below the uniform reaction temperature. After the planar reaction wave 22, there will be a hot region 26 that is typically at least above 1200 degree F. By using temperature sensors 20, the planar reaction wave 22 may be located within the matrix and moved to a desired point by controlling the output end of a process controller 28.

Figure 3:
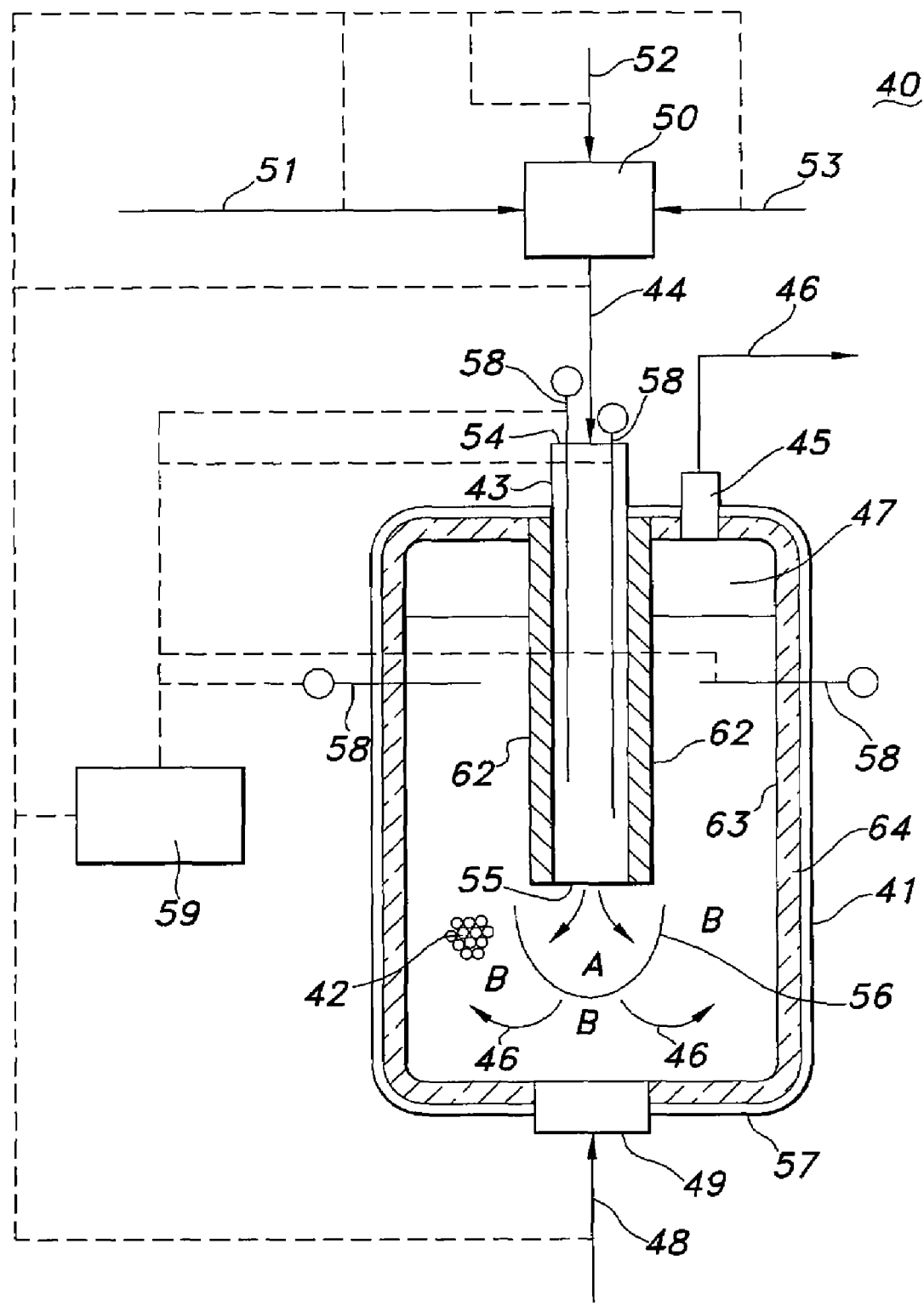
FIG. 3 is a schematic diagram of another embodiment of a flameless thermal oxidizer capable of use in the vaporization system illustrated in FIG. 1.

While this planar reaction wave temperature profile is effective for oxidation, corrosive products or reactants (such as acid gases or their pre-cursors) can tend to condense in the cool zone 27 on the interior surfaces 23 of the vessel 25. This condensation can occur when the corrosive products or reactants migrate through the lining of refractory material 24 adjacent to the interior surfaces 23 of the vessel 25. Additionally, if the vessel is constructed of heat resistant metal alloys, and there is no internal lining of refractory material, corrosive products or reactants can still condense on the interior surfaces of the vessel in the cool zone 27. This condensation can in turn can lead to corrosion of the interior surfaces of the vessel. Consequently, the life of the vessel can be reduced and/or more expensive materials of construction may be needed to improve corrosion resistance FIG. 3 shows another embodiment of a flameless matrix bed reactor 40, which can be used to oxidize one or more chemicals. Additional details of the flameless matrix bed reactor 40 can be found in U.S. Pat. No. 6,015,540.

Referring to FIG. 3, a flameless matrix bed reactor, generally designated by the numeral 40, is capable of use in the vaporization system 1 illustrated in FIG. 1 as a component of the flameless thermal oxidizer 2.

As shown in FIG. 3, the flameless matrix bed reactor includes a vessel 41, containing a matrix bed 42 of porous inert media; a vessel refractory lining 63, located adjacent to the vessel interior surfaces 64; a feed tube 43 for receiving a reactable process stream 44, where a portion of the feed tube 43 that passes through the vessel is insulated with a refractory lining 62; an exhaust outlet 45 for removing reacted process stream 46; and a void space 47 located above the matrix bed 42. The matrix bed 42 is heated by introducing a heated medium (flue gases generated by a conventional fuel gas burner) 48, such as air, through a heating inlet 49. The reactable process stream is formed by combining in a mixing device 50 a fume stream 51 containing an oxidizable material, an optional oxidizing agent stream 52 (such as air or oxygen), and an optional supplementary fuel gas stream 53.

After the reactable process stream is formed, it is fed into a feed inlet 54 of the feed tube 43. The reactable process stream is then directed to the exit 55 of the feed tube 43. A non-planar reaction wave 56 is established in the matrix bed located in a region approximately around the exit 55 of the feed tube 43 and the bottom 57 of the vessel. The reactable process stream 44 is reacted (in this embodiment oxidized) in the non-planar reaction wave 56 to produce the reacted process stream 46. The reacted process stream 46 is directed through the matrix bed 42, through the void space 47, and out the exhaust outlet 45.

The exhaust outlet 45 is positioned so that the reacted process stream 46 prior to exiting the vessel 41 flows countercurrent to the flow direction in the feed tube 43. The exhaust outlet 45 may be connected to either the void space 47 or matrix bed 42. However, it is preferred that the exhaust outlet be connected to the void space 47. Temperature sensors 58 may be used for monitoring the temperature in the flameless matrix bed reactor 40. A process controller 59 may be used for accepting input from the temperature sensors 58 and, in response thereto, controlling the flow rate of the reactable process stream 44, the fume stream 51, the optional oxidizing agent stream 52, the optional supplementary fuel gas stream 53, and/or the heated medium 48 (e.g., flue gases generated by a conventional fuel gas burner).

Figure 4:
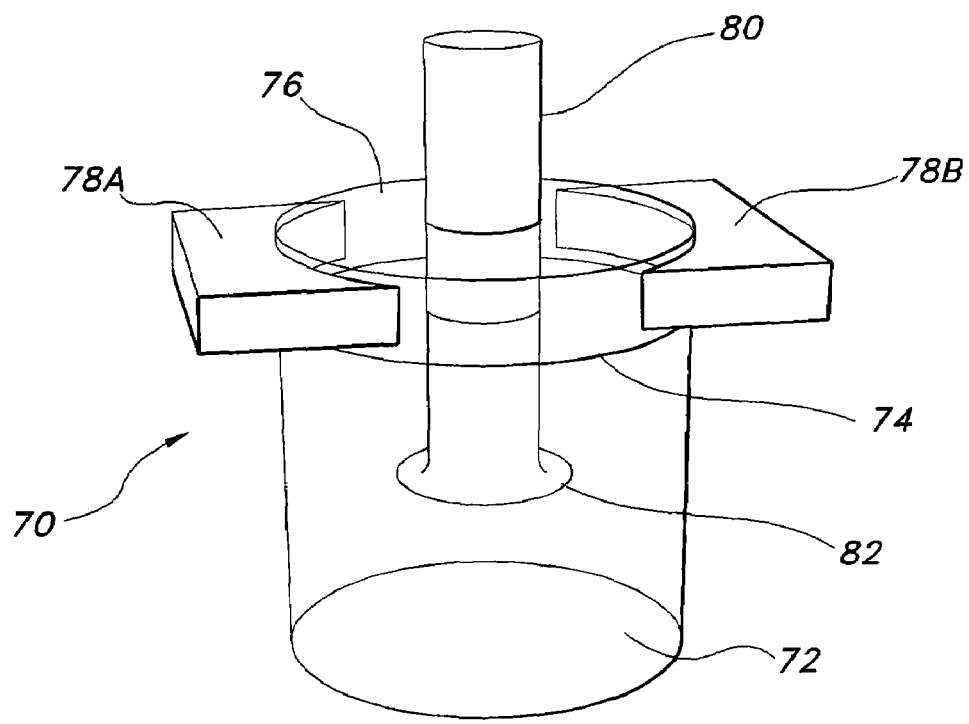
FIG. 4 is a perspective view of yet another embodiment of a flameless thermal oxidizer capable of use in the vaporization system illustrated in FIG. 1.

FIG. 4 shows a schematic, perspective view of a flameless thermal oxidizer, generally indicated by the numeral 70, that can be used as a component of the flameless thermal oxidizer 2 of the vaporization system 1 illustrated in FIG. 1. Flameless thermal oxidizer 70 includes a matrix bed 72 that extends upwardly to a top surface 74. The top surface 74 of the matrix bed 72 at least partially defines an oxidizer head space 76.

Dual, opposed exhaust ducts 78A and 78B are positioned to exhaust reacted gases from the oxidizer head space 76. Specifically, reacted gases that enter the oxidizer head space 76 from the matrix bed 72 are delivered from the flameless thermal oxidizer 70 via exhaust ducts 78A and 78B. The provision of dual, opposed exhaust ducts such as ducts 78A and 78B has been discovered to reduce the pressure losses encountered by the flameless thermal oxidizer 70.

Flameless thermal oxidizer 70 also includes a premixed gas dip tube 80 that extends downwardly into the matrix bed 72 in order to deliver a premix of gas into the matrix bed 72 at a location below the top surface 74 of the matrix bed 72. The dip tube 80 has a dip tube outlet diverter disc 82 positioned adjacent the outlet of the premixed gas dip tube 80. The disc 82 helps to divert reaction gases away from the wall of the dip tube.

Figure 5:
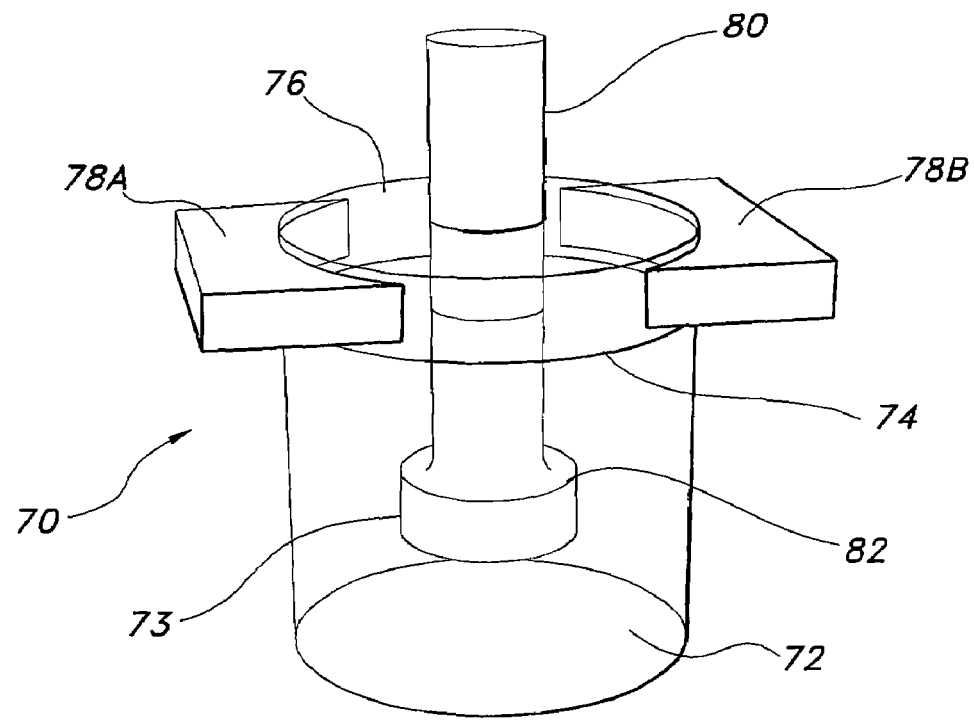
FIG. 5 is a perspective view of still another embodiment of a flameless thermal oxidizer capable of use in the vaporization system illustrated in FIG. 1.

Referring now to FIG. 5, a modification to the flameless thermal oxidizer 70 illustrated in FIG. 4 is shown. Specifically, as illustrated in FIG. 5, the flameless thermal oxidizer 70 is provided with a modification to its matrix bed 72 in order to improve the performance of the flameless thermal oxidizer 70. A void is created in the ceramic media bed or matrix bed 72 just beneath the dip tube outlet so that gases can flow with less restriction into the matrix bed 72 to lower pressure losses in the flameless thermal oxidizer 70. The void is provided in the form of a cylindrical voidage 73. In one exemplary embodiment, the voidage 73 has a diameter of about 8 feet (corresponding roughly to the diameter of the dip tube outlet diverter disc 82) and a depth of about 3 feet.

While the embodiment of the voidage 73 illustrated in FIG. 5 is substantially cylindrical in shape, it is contemplated that the voidage may have a wide variety of geometric shapes (e.g., spherical or semi spherical, elliptical, rectangular, or other geometric configurations).

Figure 6A:
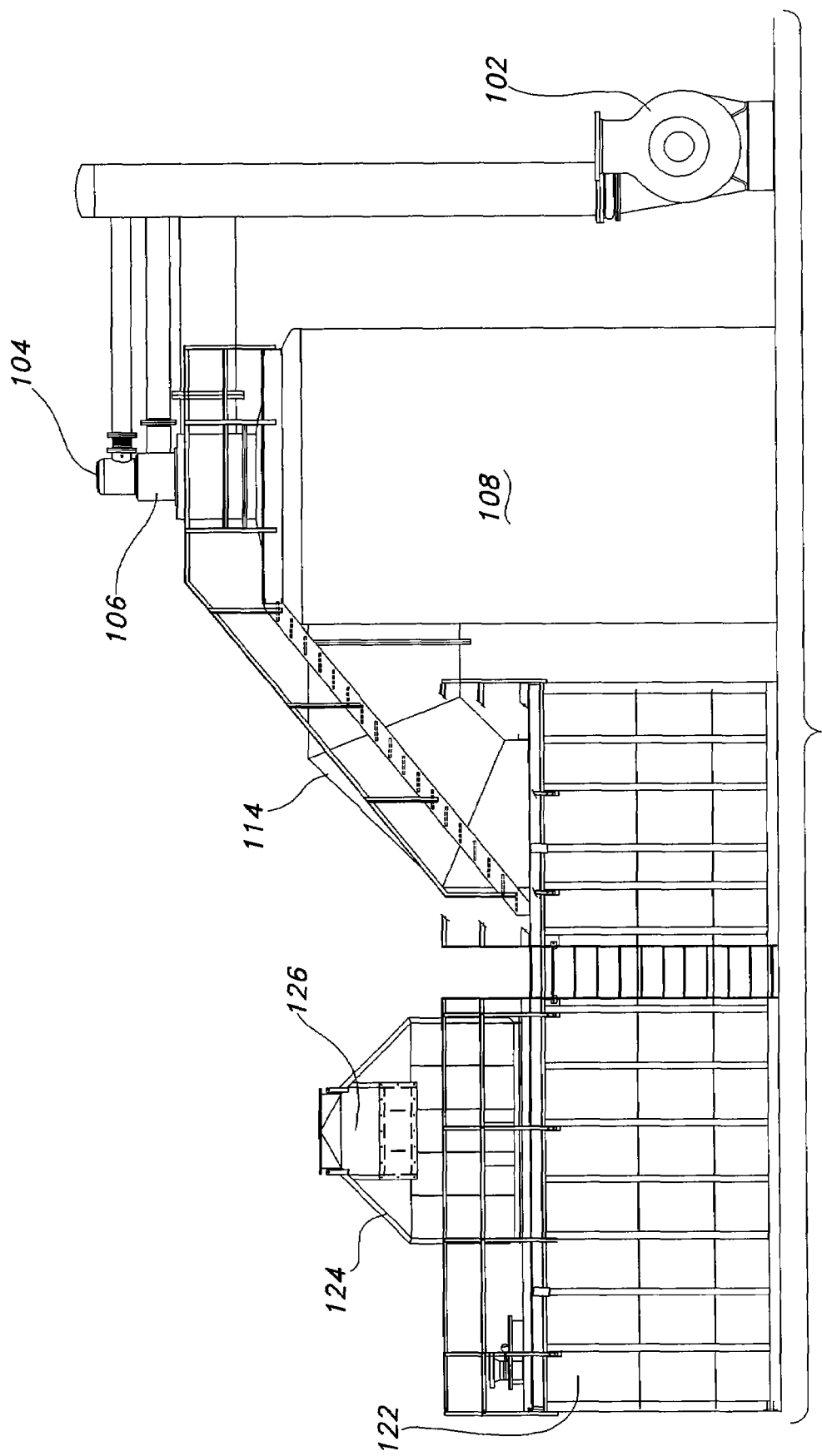
FIG. 6A is an elevation view of another embodiment of a vaporization system according to this invention.
Figure 6B:
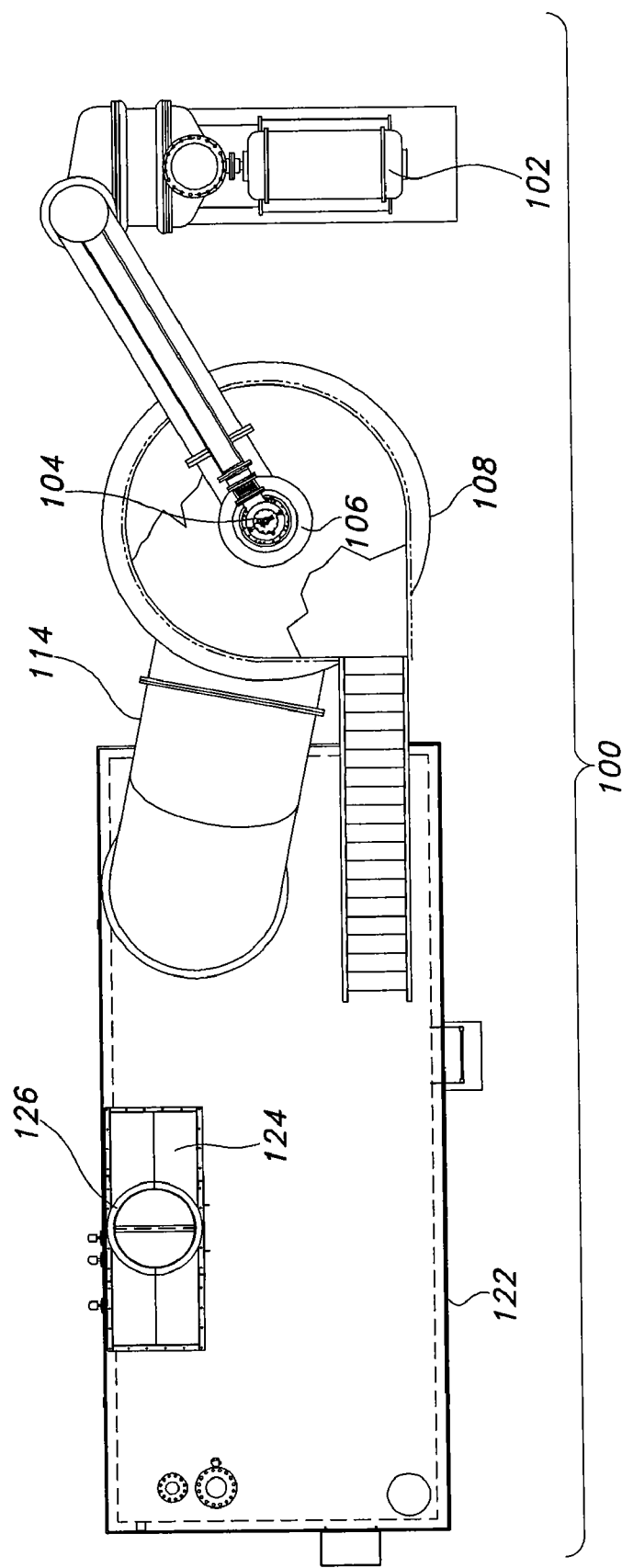
FIG. 6B is a plan view of the vaporization system illustrated in FIG. 6A.

Referring now to FIGS. 6A and 6B, another embodiment of a vaporization system, generally indicated by the numeral 100, is illustrated. Vaporization system 100 includes a blower 102 configured to urge air into the vaporization system 100. Downstream from the blower 102 is a start-up burner 104 used during start-up of the vaporizer system 100 to preheat the matrix bed (described later). Also downstream from the blower 102 is a fuel-air mixer 106 configured to mix fuel with the air introduced by the blower 102.

The vaporization system 100 also includes a flameless thermal oxidizer vessel 108 configured to receive the fuel-air mix provided by the fuel-air mixer 106. The flameless thermal oxidizer vessel 108 generates the heat that is used to vaporize liquid in the vaporization system 100. Specifically, hot gas is delivered from the flameless thermal oxidizer vessel 108 via a hot gas duct 114.

From hot gas duct 114, hot gas is introduced into an SCV tank 122. Gases are then delivered from the SCV tank 122 by means of an exhaust separator 124 and an exhaust stack 126.

Figure 6C:
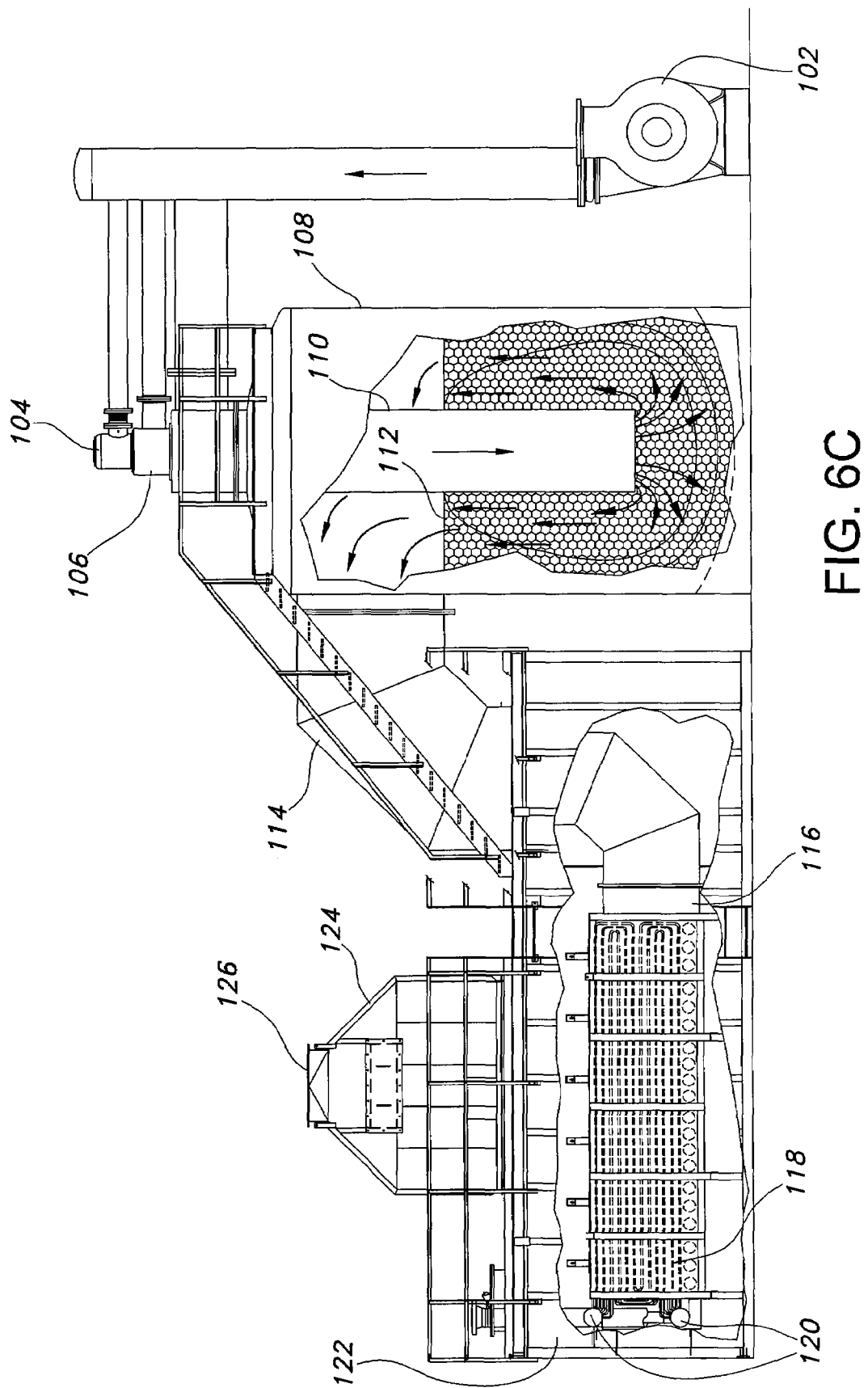
FIG. 6C is an elevation view of the vaporization system shown in FIG. 6A, with portions removed to reveal internal details.

FIG. 6C is another elevation view of the vaporization system 100, with wall portions removed to reveal internal details of the flameless thermal oxidizer vessel 108 and the SCV tank 122. The illustration in FIG. 6C also indicates the flow pattern of flue gases, indicated by arrows, in the flameless thermal oxidation vessel 108.

The flameless thermal oxidation vessel 108 includes a dip tube 110 that extends downwardly into a ceramic packing 112. A mix of fuel and air is delivered through the dip tube 110 into the ceramic packing 112 for oxidation or reaction within the ceramic packing 112. The flue gases resulting from the reaction or oxidation of the mixture of fuel and air travels upwardly through the ceramic packing 112 into a space above the ceramic packing 112 within the flameless thermal oxidation vessel 108, as indicated by the arrows in FIG. 6C. The flue gases are then urged outwardly from the flameless thermal oxidation vessel 108 and into the hot gas duct 114 for delivery to the SCV tank 122. The hot gas duct 114 is preferably insulated in order to reduce loss of heat from the flue gases.

The SCV tank 122 is at least partially filled with a heat transfer medium such as water or other suitable medium. In operation, hot flue gases from the flameless thermal oxidizer vessel 108 are introduced into the heat transfer medium such that it bubbles through the heat transfer medium, heats the heat transfer medium, and brings about heat transfer from the heat transfer medium to cryogenic liquid flowing through a tubing bundle situated in the heat transfer medium.

More specifically, the SCV tank 122 includes a manifold and distributor system such as assembly 116 connected to receive hot flue gases from the hot gas duct 114. Details of the manifold and distributor assembly will be described later with reference to FIGS. 7A-7D. The SCV tank 122 also includes a tube bundle 118 through which cryogenic liquid is circulated for vaporization. Further details of the tube bundle 118 will be described later with reference to FIGS. 8A and 8B. Liquid natural gas inlet and natural gas outlet manifolds are provided in the SCV tank 122 as indicated by numeral 120. It is by means of the inlet and outlet manifolds 120 that liquid natural gas is introduced into the tube bundle and the resulting natural gas is discharged from the tube bundle.

Referring now to FIGS. 7A through 7D, details of an embodiment of a manifold and distributor assembly are illustrated. The manifold and distributor assembly, such as assembly 116, is configured to receive hot gases from the hot gas duct 114 and to deliver those hot gases into the heat transfer medium (e.g., water) in the SCV tank 122. More specifically, the manifold and distributor assembly 116 receives a stream of heated gas and divides that gas for substantially even distribution into the SCV tank to encourage heat transfer between the hot gases, the heat transfer medium, and ultimately the cryogenic liquid such as liquid natural gas circulating within the tube bundle 118.

Figure 7A:
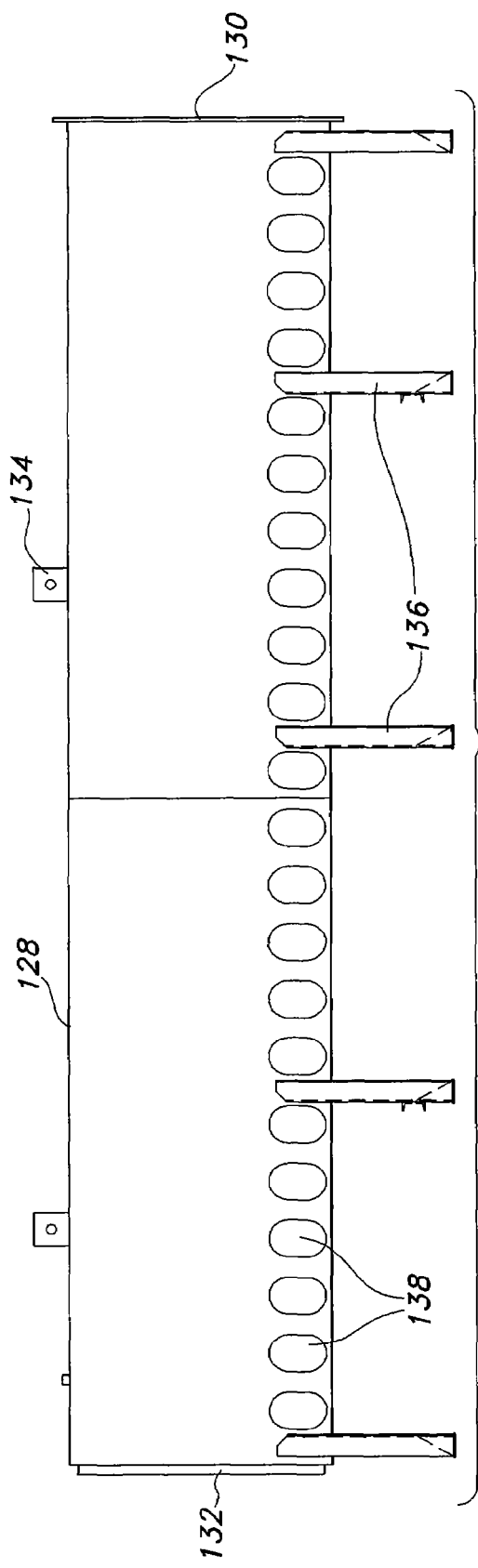
FIG. 7A is an elevation view of an embodiment of a manifold and distributor assembly capable of use in the vaporization system illustrated in FIG. 6A.

Referring specifically to FIG. 7A, the manifold and distributor assembly 116 includes a shell 128 that is substantially cylindrical in shape, though other cross-sectional shapes are contemplated as well. Shell 128 is coupled to the hot gas duct 114 by means of a flange 130. The opposite end of the shell 128 is capped by a plate 132. Plural lifting lugs 134 are provided along a top surface of the shell 128 in order to facilitate the handling of the shell 128 during assembly, disassembly, modification and/or maintenance. Plural supports 136 are provided to support the shell 128 against a foundation of the SCV tank 122 (not shown).

In order to facilitate the distribution of hot gases from within the shell 128 to the heat transfer medium, the manifold and distributor assembly 116 is provided with plural spargers 138. Each sparger 138 extends outwardly from the shell 128 and is connected to the shell 128 in order to receive hot gases from the shell 128 and to deliver the hot gases to the heat transfer medium within the SCV tank 122.

Figure 7B:
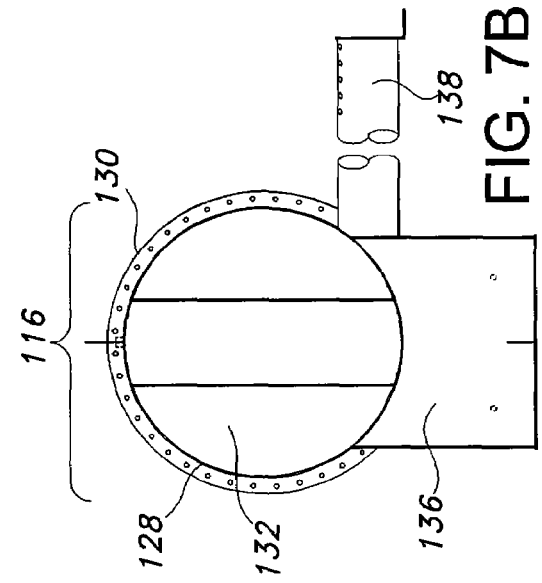
FIG. 7B is an end view of the manifold and distributor assembly illustrated in FIG. 7A.

Referring to FIG. 7B, which provides an end view of the manifold and distributor assembly 116, the relationship between the sparger 138 and the shell 128 of the manifold and distributor assembly 116 can be seen. Specifically, each sparger 138 extends outwardly from a lower portion of the shell 128 at an angle substantially transverse to the axis of the shell 128.

Figure 7D:
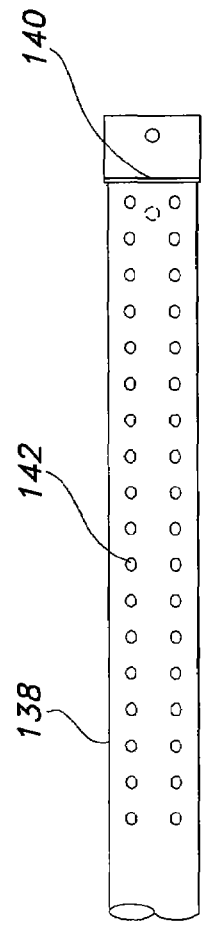
FIG. 7D is a plan view of a portion of the manifold and distributor assembly illustrated in FIG. 7A.
Figure 7C:
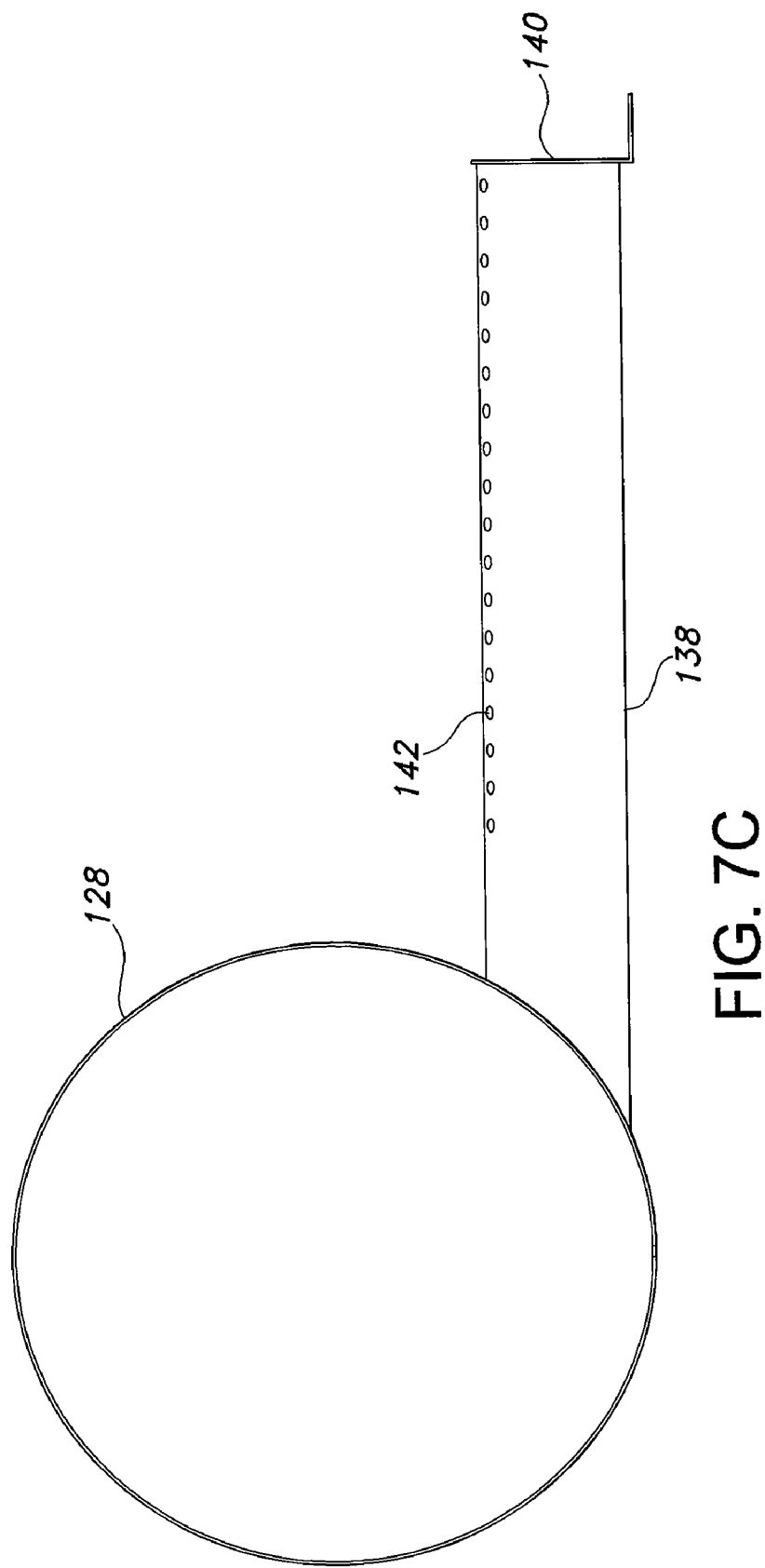
FIG. 7C is a cross-sectional, end view of the manifold and distributor assembly illustrated in FIG. 7A.

Referring to FIG. 7C, which provides a cross-sectional end view of the manifold and distributor assembly 116, each sparger 138 is provided with a closed end 140 and a plurality of openings 142 (generally positioned along its upper surface) to permit the flow of hot gases from within the sparger 138 to the heat transfer medium in the SCV tank 122.

FIG. 7D provides a plan view of a portion of a sparger 138. Each sparger 138 includes plural rows of openings 142 (two such row shown in FIG. 7D). By means of openings 142, hot gas flows from within each sparger 138 and into the heat transfer medium in the SCV tank 122.

While a specific embodiment of a manifold and distributor assembly 116 is shown in the Figures for purposes of illustration, a wide variety of configurations can be used in order to deliver hot gases to a heat transfer medium. Depending on a particular application or size constraints for a vaporization system, the manifold and distributor assembly can have a wide variety of shapes, sizes, and configurations. Preferably, however, the assembly will be configured to distribute hot gases substantially evenly into heat transfer medium so that heat can be substantially evenly distributed for the vaporization of cryogenic liquid.

Figure 8A:
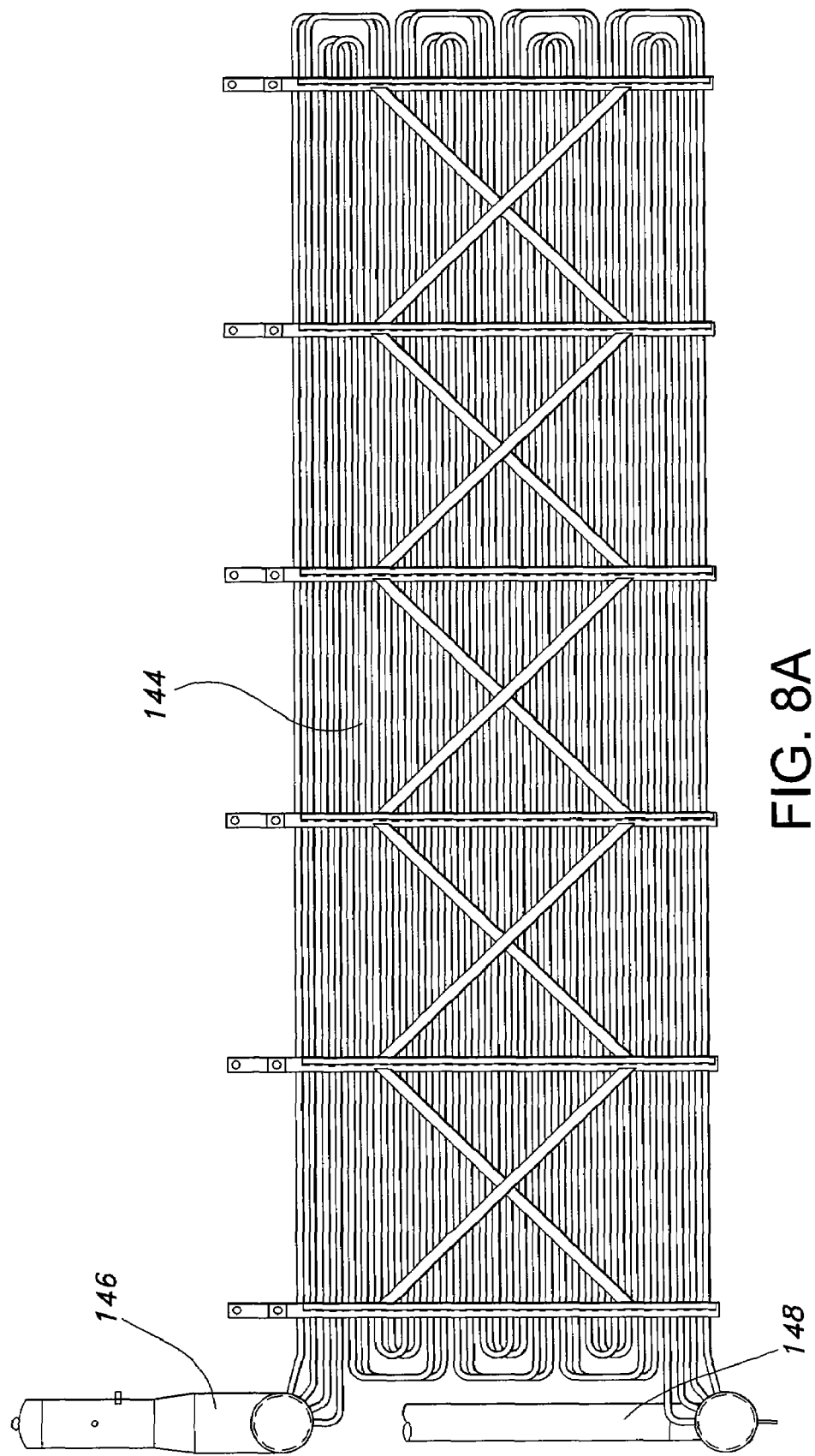
FIG. 8A is an elevation view of an embodiment of a tube bundle assembly capable of use in the vaporization system illustrated in FIG. 6A.

Referring now to FIGS. 8A and 8B, an exemplary embodiment of a tube bundle configured for use in the SCV tank 122 is illustrated. The tube bundle 144 illustrated in FIG. 8A includes four (4) tubes, each extending from an inlet 146 for liquid natural gas (or other cryogenic liquid) to an outlet 148 for vaporized natural gas (or other gas). The inlet 146 and outlet 148 of tube bundle 144 correspond to the inlet and outlet manifolds 120 illustrated in FIG. 6C.

As illustrated in FIG. 8B, which provides a cross-sectional end view of tube bundle 144 (with the tubes removed for clarification), the inlet 146 and outlet 148 are provided with a plurality of openings for connection to tube bundles such as tube bundle 144. Accordingly, a plurality of tube bundles 144 are positioned next to each other and are connected for fluid flow communication with the inlet 146 and outlet 148 in order to provide a dense population of flow passages through which a cryogenic fluid can be passed for vaporization. For example, inlet 146 and outlet 148 can accommodate up to fifteen (15) or more tube bundles 144, each tube bundle 144 including four (4) tubes. In such an embodiment, the tube bundle assembly will provide sixty (60) tubes for the flow of cryogenic liquid such as liquid natural gas (LNG). Each tube bundle 144 can also have fewer or more than four tubes, and the tube bundle assembly can have fewer or more than fifteen (15) rows of tube bundles.

EXAMPLE

According to one aspect of this invention, a flameless thermal oxidizer can be modified to create a cylindrical void at the diptube outlet. Also, a flat disc can be added to the end of the diptube to direct reacting gases away from the diptube walls. These modifications were run on a CFD model and resulted in a significant reduction in pressure losses and also changed the shape of the reaction wave to force improved containment of the reaction gases within the ceramic media bed.

The flameless thermal oxidizer was setup in the CFD model with a 60 inch ID by 20 foot long diptube. The ceramic media was simulated as 1 inch saddles, such as those used in commercial applications, packed to a depth of 16 feet. The diptube was simulated as being immersed 8 feet into the ceramic media bed. Two rectangular exhaust ducts were simulated to be used to convey flue gases from the surface of the ceramic media bed. The ducts were simulated to be installed 180 degrees apart in the headspace above the ceramic media bed. Dimensions for the ducts were simulated to be 2.5 feet high by 15 feet wide by 10 feet in length. The outlet of the diptube was simulated to be fitted with an 8 foot diameter disc to divert reaction gases away from the diptube wall. A void was simulated to be created in the ceramic media bed directly beneath the diptube outlet so that gases could flow with less restriction in an attempt to lower pressure losses in the flameless thermal oxidizer. The void was simulated to be a cylindrical volume 8 feet in diameter and 3 feet in height.

The LNG vaporizer was simulated to exert a 60 inch water column back pressure on the heat source due to pressure losses in the heat exchanger tube bundle and water bath. Addition of the disc to the diptube outlet and the void constructed in the ceramic medial bed significantly reduced the pressure losses in the flameless thermal oxidizer. The reduction in pressure losses was simulated to be approximately 45 inches WC, yielding a total pressure loss across the flameless thermal oxidizer of only 17 inches WC.

According to the simulation, the velocity of the premixed gases traveling down the diptube is approximately 50 feet per second. The total mass flow rate is approximately 4400 lbs/min yielding a heat release of 122 MMBtu/hr HHV. Combustion air is supplied at the rate of 4311 lbs./min and fuel gas at the rate of 86.26 lbs/min and, according to the simulation, the composition of the flue gases in volume percent is as follows:

| Component | Volume Percent |
|---|---|
| Oxygen | 13.38 |
| Nitrogen | 76.54 |
| Carbon Dioxide | 3.32 |
| Water Vapor | 6.77 |

The gas velocity profile has been discovered to be significantly different in the ceramic bed with the optional cylindrical voidage beneath the diptube outlet, which contributes to a significant reduction in static pressure losses. Specifically, the temperature profile within the flameless thermal oxidizer after having installed the diptube exit disc and the voidage beneath the diptube differs from that of a flameless thermal oxidizer having ceramic media packing at the diptube discharge point and no disc attached to the diptube outlet. Also, it has been discovered that less carbon monoxide is present in the headspace above the ceramic media surface as compared to the unmodified oxidizer model. Although carbon monoxide burnout is achieved prior to the exhaust ducts in both designs, this feature is an improvement and lends more operational flexibility to the process.

The CFD modeling results for a flameless thermal oxidizer with a diverter disc mounted on the discharge of the diptube and a cylindrical voidage located beneath the diptube discharge have indicated a significant reduction in static pressure losses across the oxidizer. This improvement benefits the operating economics for the flameless thermal oxidizer in the LNG vaporizer application. Pressure losses across the flameless oxidizer now amount to only 17 inches WC.

Assuming that the pressure loss across the LNG vaporizer heat exchanger is not impacted by the flameless thermal oxidizer flue gas flow rate, then the total system pressure loss has been reduced from 122 inches WC to 77 inches WC. This represents a 37 percent reduction in pressure losses with the flameless thermal oxidizer modifications presented here. The pressure loss reduction across the flameless thermal oxidizer alone is a significant 72.6 percent with the modified design.

The temperature profile indicates that the reaction wave is better confined to the ceramic media bed with the modified design. While it has been generally considered acceptable for there to be some cold gas breakout into the headspace without a loss in performance, the reaction wave should remain within the ceramic media bed in order to increase the robustness of the flameless thermal oxidizer and reduce any perception of loss in performance associated with cold gas breakout.

Although the invention is illustrated and described herein with reference to specific embodiments, the invention is not intended to be limited to the details shown. Rather, various modifications may be made in the details within the scope and range of equivalents of the claims and without departing from the invention.

For example, the specific structures of the vaporizer and the flameless thermal oxidizer are not critical to the invention and may be modified within the scope of this invention. A wide variety of heat sources and heat exchangers can be utilized according to aspects of this invention. Similarly, the orientation of a heat exchanger (such as a vaporizer) with respect to the heat source (such as a flameless thermal oxidizer) can be modified to meet specific operating parameters.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A system for vaporizing a cryogenic liquid, said system comprising:
    means for producing an exhaust gas by flameless thermal oxidation of a fuel;
    an insulated duct having an inlet end coupled to an exhaust outlet of the exhaust gas producing means for receiving the exhaust gas from the exhaust gas producing means, said duct being thermally insulated; and
    means for transferring heat from the exhaust gas to the cryogenic liquid, said heat transferring means including an inlet end being coupled to an outlet end of the insulated duct for receiving the exhaust gas from the exhaust gas producing means;
    said inlet end of said insulated duct being coupled to the exhaust outlet of the exhaust gas producing means at a first elevation and said outlet end of said insulated duct being coupled to the inlet end of the heat transferring means at a second elevation, wherein the first elevation and the second elevation are not equal,
    wherein said means for transferring heat comprises a receptacle configured to hold a heat transfer medium, a conduit for cryogenic liquid extending into said receptacle, and a sparger positioned to deliver exhaust gas from said exhaust gas producing means to said receptacle.

2. The system of claim 1, said means for producing an exhaust gas comprising an oxidizer having a matrix bed, a fuel/air mixture inlet positioned to deliver the fuel/air mixture to said matrix bed, and an exhaust outlet positioned to deliver the exhaust gas from said oxidizer to said heat transferring means.

3. A system for vaporizing a cryogenic liquid, said system comprising:
    a flameless thermal oxidizer (FTO) configured to generate an exhaust gas including an exhaust outlet positioned to deliver the exhaust gas from said FTO;
    a duct having an inlet end coupled to the exhaust outlet of the FTO for receiving the exhaust gas from the FTO; and
    a heat exchanger coupled to receive the exhaust gas from said duct, said heat exchanger comprising a receptacle configured to hold a heat transfer medium, a conduit for cryogenic liquid extending into said receptacle, and a sparger positioned to deliver exhaust gas from said FTO to said receptacle, said heat exchanger being configured to transfer heat from the exhaust gas of the FTO to the cryogenic liquid;
    said sparger of said heat exchanger extending into said receptacle of said heat exchanger and being positioned at an elevation beneath the cryogenic liquid conduit to deliver exhaust gas into the heat transfer medium at an elevation beneath the cryogenic liquid conduit.

4. A method for vaporizing a cryogenic liquid, said method comprising the steps of:
    oxidizing a fuel in a flameless thermal oxidizer (FTO) to produce an exhaust gas;
    distributing the exhaust gas through an exhaust outlet of the FTO;
    delivering the exhaust gas through a thermally-insulated duct that is coupled to the exhaust outlet of the FTO;
    distributing the exhaust gas into a plurality of spargers coupled to the duct, each sparger including an outlet opening for distributing the exhaust gas from a respective sparger; and transferring heat from the exhaust gas distributed from the plurality of spargers to a heat transfer medium in which a cryogenic liquid conduit containing the cryogenic liquid is submerged, thereby vaporizing the cryogenic liquid.

5. The method of claim 4, said oxidizing step comprising delivering a fuel/air mixture into a matrix bed.

6. A method for providing a heat source to a vaporizer of cryogenic liquid including a cryogenic liquid conduit containing the cryogenic liquid, the method comprising the steps of:
  coupling an inlet end of a duct to an exhaust outlet of a flameless thermal oxidizer (FTO) for receiving exhaust gas from the FTO;
  coupling an outlet end of the duct to a sparger for distributing the exhaust gas into the sparger;
  positioning the sparger at an elevation beneath the cryogenic liquid conduit containing the cryogenic liquid; and
  positioning the plurality of outlet openings of the sparger to face the cryogenic liquid conduit containing the cryogenic liquid to deliver exhaust gas to the cryogenic liquid conduit containing the cryogenic liquid.

7. The method of claim 6, further comprising the step of uniformly positioning a plurality of spargers at an elevation beneath the cryogenic liquid conduit containing the cryogenic liquid, each sparger being configured to deliver exhaust gas to the cryogenic liquid conduit containing the cryogenic liquid.

8. A method for vaporizing a cryogenic liquid with reduced NOx emissions, said method comprising the steps of:
  oxidizing fuel using a flameless thermal oxidizer;
  transferring heat from exhaust gases generated by said oxidizing step through an insulated duct to a cryogenic liquid conduit containing the cryogenic liquid submerged in a heat transfer medium;
  exhausting the exhaust gases; and
  emitting less than about 5 ppmvd NOx, corrected to 3 volume percent oxygen (dry basis) without catalytic treatment of the exhaust gases.

9. The method of claim 8, further comprising the step of emitting about 4 ppmvd NOx or less, corrected to 3 volume percent oxygen (dry basis).

10. The method of claim 8, further comprising the step of emitting about 2 ppmvd NOx or less, corrected to 3 volume percent oxygen (dry basis).

11. The system of claim 3, further comprising a plurality of spargers extending into said receptacle and being evenly distributed at an elevation beneath the cryogenic liquid conduit for delivering exhaust gas into the heat transfer medium at an elevation beneath the cryogenic liquid conduit.

12. The system of claim 11, further comprising a hollow shell including an inlet end coupled to an outlet end of said duct to receive exhaust gases from the FTO and a plurality of outlet openings each being coupled to a respective sparger to deliver exhaust gas into each sparger.

13. The system of claim 12, wherein each sparger extends outwardly from said hollow shell at an angle substantially transverse to an axis of said hollow shell.

14. The system of claim 12, said hollow shell being positioned outside of said enclosure of said heat exchanger.

15. The system of claim 3, said sparger further comprising exhaust gas openings positioned to face the cryogenic liquid conduit, each opening being sized to permit the flow of exhaust gases therethrough.

16. The system of claim 3, said FTO comprising:
  a matrix bed containing media; and
  an inlet tube extending into said matrix bed and having an outlet positioned to deliver reacting gases into said matrix bed;
  said matrix bed defining a void proximal said outlet of said inlet tube.

17. The system of claim 16, said FTO further comprising a disc positioned adjacent said outlet of said inlet tube and configured to direct reacting gases away from said inlet tube.

18. The system of claim 16, said void being substantially cylindrical.

* * * * *